L. A. PLUMB.
Tea and Coffee Pot.

No. 57,372. Patented Aug. 21, 1866.

Witnesses:

Inventor,
Lok. A. Plumb.

UNITED STATES PATENT OFFICE.

LUKE A. PLUMB, OF BIDDEFORD, MAINE.

IMPROVEMENT IN TEA AND COFFEE POTS.

Specification forming part of Letters Patent No. 57,372, dated August 21, 1866.

*To all whom it may concern:*

Be it known that I, LUKE A. PLUMB, of Biddeford, in the county of York and State of Maine, have invented a new and useful Improvement in Tea and Coffee Pots; and I do hereby declare that the following is a full, clear, and exact description thereof, which will enable those skilled in the art to make and use the same, reference being had to the accompanying drawings, forming part of this specification.

Figure 1:
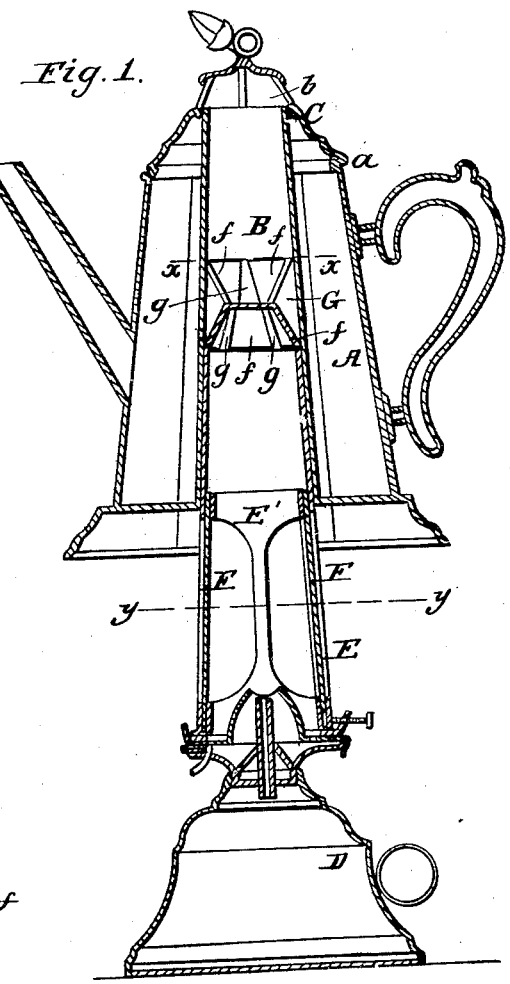
Figure 3:
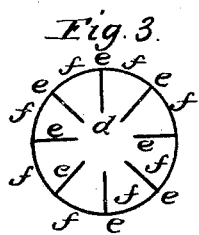
Figure 4:
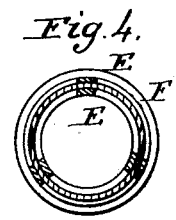
Figure 2:
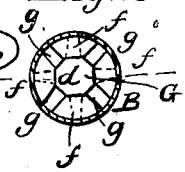

Figure 1 is a vertical central section of my invention complete; Fig. 2, a horizontal section of a portion of the same, taken in the line $x\,x$, Fig. 1; Fig. 3, a detached view of a circular plate, drawn with a view of showing the construction of a certain part pertaining to the invention; Fig. 4, a horizontal section of tubes used with the invention, taken in the line $y\,y$, Fig. 1.

Similar letters of reference indicate corresponding parts.

This invention relates to a new and improved tea and coffee pot designed for heating and keeping in a warm state the contents of the pot while in use.

The invention consists in constructing the pot with a central flue extending its whole length, with a hole made in the center of the cover to fit over the top of the flue and closely confine the contents of the pot, while the upper end of the flue will be left open, the device above mentioned being used in connection with a tube applied to a lamp and arranged in such a manner as to admit of the pot being readily applied to and removed from the lamp, while heat is prevented from being conducted down to the lamp in sufficient degree to cause a too great evaporation of the oil or burning-fluid within it.

A represents a tea or coffee pot, constructed in any of the known forms and of sheet metal. This pot has a flue, B, fitted centrally within it and extending its whole height, the orifice of the bottom of said flue being flush with the bottom of the pot.

C represents the cover or lid of the pot, attached to the latter by a hinge, $a$, and having a hole, $b$, at its center, the diameter of which is equal to the external diameter of the upper end of the flue B. When the cover or lid of the pot is closed the contents of the latter will be closely confined, while the upper end of the flue will be open, as shown clearly in Fig. 1. This central flue B serves as a chimney for a lamp, and by the heat radiated from it causes the contents of the pot to be heated and kept in a warm state while the pot is in use.

D is a lamp, which may be constructed in any of the known forms, and E is a tube, which is fitted on the lamp and secured in position in the same manner as an ordinary glass chimney. This tube E is slotted vertically, or has quite large openings made in it, which are covered with mica F. This mica admits of the wick being seen, so that the flame may be readily adjusted, and the openings also prevent the tube E conducting heat from the flame down to the lamp, so that the oil or burning-fluid within the latter will not be unduly evaporated. This is an important feature of the invention, as the lamp is prevented from smoking or emitting an offensive odor.

Thus it will be seen that the pot, while in use, may be readily applied to and removed from the lamp and the tea or coffee kept in a warm state during meal times. When a cup of tea or coffee is to be poured out of the pot, the latter is simply lifted off from the tube E and tilted so that its contents may pass out of the spout $d$, and the pot is then placed back on the rest.

In order to increase the radiation of heat from the flue B, I employ a radiator, G, within said flue, said radiator being constructed out of a circular plate, $d$, slotted radially, as shown at $e$, Fig. 3, and the metal $f$ between said slots being bent or curved alternately upward and downward to an inclined position, so that the device, as a whole, will be of biconical shape, with spaces $g$ between the portions of metal $f$. This device seems to arrest the products of combustion and cause the heat to be deflected against the side of the flue B, so as to be radiated therefrom. By this means much heat is radiated from the flue within the pot which would otherwise escape from the top thereof.

In order to secure the mica F within the tube E, I employ an internal thimble or tube, E', which is provided with slots or openings precisely of the same size and form as those in the tube E.

The mica is in one piece and bent in the form of a tube and inserted within E, and the thimble or tube E' then inserted within the mica, as shown clearly in Fig. 4, the openings in the two tubes E E' coinciding with each other. By this means the mica may be very readily inserted in the tube E and firmly secured therein.

I do not claim, broadly, the treating of liquids by means of a flue or chimney of a lamp passing through a vessel containing the liquid to be heated, for that is an old device; but I do claim as new and desire to secure by Letters Patent—

1. The flue B within the pot A, in combination with the tube E, provided with openings covered with mica F, and the lamp D, all arranged substantially as and for the purpose specified.

2. The radiator G, in combination with the flue B and pot A, substantially as and for the purpose set forth.

LUKE A. PLUMB.

Witnesses:
 WM. F. MCNAMARA.
 C. L. TOPLIFF.